United States Patent [19]

Eustache et al.

[11] Patent Number: 5,209,140
[45] Date of Patent: May 11, 1993

[54] WINDSHIELD WIPER APPARATUS HAVING A RETRACTION FACILITY

[75] Inventors: Jean-Pierre Eustache, Antony; Philippe Arlon, Ozoir la Ferriere, both of France

[73] Assignee: Valeo Systems d'Essuyage, Montigny-le-Bretonneux, France

[21] Appl. No.: 537,930

[22] Filed: Jun. 13, 1990

[30] Foreign Application Priority Data

Jun. 15, 1989 [FR] France ................... 89 07966

[51] Int. Cl.$^5$ ............ B60S 1/08; B60S 1/22; B60S 1/24; F16H 21/40
[52] U.S. Cl. ................... 74/601; 74/42; 74/600; 15/250.16
[58] Field of Search ......... 15/250.16, 250.17, 250.19, 15/250.13, 250.30, 250.31; 74/42, 600, 601, 52, 70, 75

[56] References Cited

U.S. PATENT DOCUMENTS

| 4,400,844 | 8/1983 | Hayakawa et al. | 15/250.16 |
| 4,494,421 | 1/1985 | Matuoka | 15/250.17 |
| 4,686,733 | 8/1987 | Sahara | 15/250.16 |
| 4,729,144 | 3/1988 | Sahara et al. | 15/250.16 |
| 4,794,818 | 1/1989 | Eustache et al. | 15/250.16 |
| 4,916,774 | 4/1990 | Arlon et al. | 15/250.16 |

FOREIGN PATENT DOCUMENTS

| 2143271 | 3/1972 | Fed. Rep. of Germany . | |
| 2900166 | 7/1979 | Fed. Rep. of Germany | 15/250.16 |
| 3711933 | 10/1988 | Fed. Rep. of Germany | 15/250.16 |
| 3738434 | 5/1989 | Fed. Rep. of Germany | 15/250.16 |
| 2607765 | 6/1988 | France | 15/250.16 |
| 0232053 | 9/1988 | Japan | 15/250.16 |
| 0190562 | 7/1989 | Japan | 15/250.13 |
| 2141021 | 12/1984 | United Kingdom . | |
| 2219491 | 12/1989 | United Kingdom | 15/250.16 |

Primary Examiner—Harvey C. Hornsby
Assistant Examiner—Gary K. Graham
Attorney, Agent, or Firm—Dennison, Meserole, Pollack & Scheiner

[57] ABSTRACT

A windshield wiper apparatus having a facility for retraction of the wiper blade, including a cranked driving arm which carries a pivot pin on which an eccentric knuckle piece is rotatably mounted. A driven crank is articulated on the knuckle piece and the latter is provided with a ratchet which includes a finger and radial arm.

The knuckle piece is in two parts, comprising a member which carries the ratchet and a second member which is formed with a recess for receiving the radial arm of the ratchet.

The invention is especially applicable to automotive vehicles.

8 Claims, 1 Drawing Sheet

WINDSHIELD WIPER APPARATUS HAVING A RETRACTION FACILITY

FIELD OF THE INVENTION

This invention relates to windshield wiper apparatus, in particular for automotive vehicles, in which a retracted position allows a windshield wiper incorporated in the apparatus to lie below the bottom edge of the surface to be wiped.

BACKGROUND OF THE INVENTION

One apparatus of the above kind is described in U.S. patent application Ser. No. 337,405, filed Apr. 13, 1989, now U.S. Pat. No. 4,916,774, and in the corresponding published French patent application No. FR 2 630 068A. As disclosed in those documents, the apparatus comprises a first, or cranked, arm, which is a driving arm mounted on a motor spindle and which has a pivot pin mounted close to the end of the cranked arm remote from the motor spindle. This pivot pin carries an eccentric knuckle piece, on which a second arm, or driven crank, is articulated by means of a socket which is carried by the second arm. The said knuckle piece is provided with a ratchet which includes a finger moveable in a direction substantially parallel to the axis of the pivot pin under the action of a spring. The ratchet is adapted to leave the knuckle piece free with respect to the first arm in a first direction of rotation of the latter, but to arrest the knuckle piece in the opposite direction of rotation. The assembly is such that, in normal operation, the first arm rotates in one direction for which the position of the eccentric knuckle piece remains constant with respect to one of the two elements consisting of the driven crank (the second arm) and the driving (first) arm, while during reversal of the direction of rotation of the driving arm, the knuckle piece is driven in rotation with respect to the said element. This causes a variation in eccentricity to occur, together with retraction of the windshield wiper.

To this end, the ratchet includes a radial arm which projects outwardly from the knuckle piece, while the socket has a recess for receiving the end of this arm.

Thus, in normal operation the knuckle piece is coupled in rotation with the socket by cooperation of the ratchet arm with the recess of the socket. In such an arrangement, the driven arm and the driving arm arranged to perform, relative to each other, a "universal" movement through the joint described above, which essentially a ball and socket type or knuckle joint, in which this movement consists essentially of rotational movement associated with inclination or tilting of the two arms with respect to each other.

The availability of this tilting movement is limited by the fact that in normal operation, the ratchet arm cooperates risk during severe tilting of coming into contact with the end of the said finger. This can cause fracture and therefore render the coupling inoperative. Similarly, in the retracted position of the wiper, the ratchet finger is engaged in the space lying between the driving arm and the socket, so as largely to occupy this space. In this position, the driven arm can only tilt in one direction, opposite to that in which the ratchet arm lies. In the opposite case, this arm presents an obstacle to the tilting movement.

Such an obstacle introduces the risk of malfunctioning occurring in the assembly of the two arms, which may be reflected in the level of the retracted position.

DISCUSSION OF THE INVENTION

The present invention proposes a remedy for the disadvantages mentioned above, by providing a windshield wiper apparatus in which one of the arms is able to tilt in all possible directions with respect to the other without detriment to the location of the retracted position of the assembly.

In accordance with the invention, windshield wiper apparatus with a retractable windshield wiper blade, comprising a first arm or cranked arm mounted on a motor spindle, the said cranked arm being provided, close to that one of its ends which is furthest from the motor spindle, with a pivot pin which carries an eccentric knuckle piece, on which is articulated a second arm or crank by means of a socket carried by the said crank, the said knuckle piece being provided with a ratchet, which includes a finger and a radial arm which are adapted to be received, respectively, in a recess and in another recess, is characterised in that the knuckle piece is in two parts comprising two members, with one of the said members carrying the ratchet while the other one of the said members carries the said recess for receiving the radial arm of the ratchet.

The part spherical surface of the knuckle piece is thus totally free of any obstacle, while the socket carried by the crank or second arm is able to oscillate without any hindrance in any direction whatever.

The other features and advantages of the invention will appear more clearly from the description which follows. which is given by way of example only and with reference to the accompanying drawings.

DESCRIPTION OF A PREFERRED EMBODIMENT OF THE INVENTION

Figure 1:
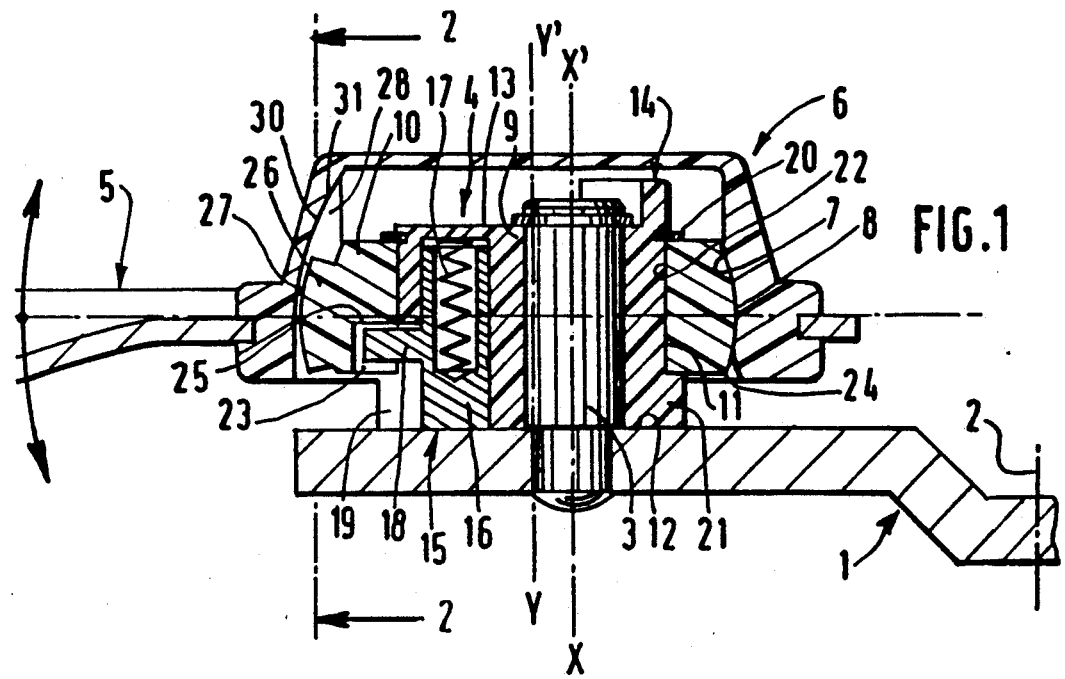
FIG. 1 is a view in cross section showing the apparatus during normal operation.

With reference to FIG. 1, the windshield wiper apparatus includes a first arm 1, which is cranked and which is mounted on a motor spindle 2 indicated diagrammatically as an axis in FIG. 1. Near the end of the cranked arm 1 opposite that which carries the spindle 2, the cranked arm 1 carries a pivot pin 3 defining an axis XX' which is substantially parallel to the axis of the spindle 2. The pivot pin 3 is secured on the cranked arm 1 by any appropriate means, for example by riveting, and carries a generally part spherical knuckle piece 4, defining an axis YY'. The knuckle piece 4 is mounted so as to be freely rotatable on the pivot pin 3, but eccentrically, the two axes XX' and YY' not being coincident.

A second arm or crank 5 is articulated on the knuckle piece 4 through a socket 6 having a concave, curved internal surface 7 which fits the part spherical outer surface 8 of the knuckle piece 4. Without departing from the scope of the invention, the socket 6 may of course be made of a plastics material, as is in fact shown in FIG. 1, or alternatively it may be formed integrally with the body of the crank 5.

The knuckle piece 4 comprises two components 9 and 10, which are mounted coaxially one within the other and which are freely rotatable with respect to each other. The component 9 is a cylindrical member having an axis coincident with the axis YY' and parallel to the axis XX' of the pivot pin 3. The cylindrical member 9 is arranged on the pivot pin 3 and is freely rotatable with respect to the latter. This member 9 has an outer cylindrical wall 11, which is defined between two transverse surfaces 12 and 13. These surfaces are parallel to each other and spaced apart. The member 9 lies directly against the cranked arm 1, which it engages through its transverse end surface 12.

A rotation limiting end stop means 14 is carried by the transverse end surface 13 of the cylindrical member 9, i.e. at the end of the latter remote from the cranked arm 1. The member 9 also carries a ratchet 15, which comprises a finger 16 moveable in a direction substantially parallel to the axis XX' of the pivot pin 3 under the action of resilient means, which in this example consists of a spiral spring 17. The ratchet 15 also has a radial arm 18, the end of which projects beyond the cylindrical outer wall 11 of the member 9. For this purpose the member 9 includes a groove 19 which extends axially substantially parallel to the ratchet 15. The open side of the groove 19 communicates into the opening in which the ratchet 15 is carried, and also on to the wall 11, in such a way as to enable the arm 18 to be displaced.

The other member 10 of the knuckle piece 4 lies on the outer wall 11 of the member 9, on which it is free to rotate. The member 10 is however limited in axial translation movement by a first end stop means. The latter consists in this example of a circlip 20 and a shoulder 21. The circlip 20 is carried by the cylindrical member 9 close to the transverse end face 13 of the latter. The shoulder 21 is defined on a portion of greater diameter than that of the cylindrical member 9.

A radial recess 23 is formed in the inner wall 22 of the outer member 10 which is in contact with the outer wall 11 of the inner member 9. The recess 23 is open, firstly towards the member 10 and secondly towards the cranked arm 1. The recess 23 terminates in the open face 24 of the socket 6, and its circumferential dimension is similar to that of the groove 19. The base wall of the recess 23 is spaced away from the cranked arm 1, so that the arm 18, penetrating into the recess, will not come into contact with this base wall. In addition, the recess 23 has a radius, measured from the axis YY', which is greater than the radius of the arm 18, again from the axis YY'; it is however of smaller radius than the part spherical surface 8 of the outer member 10 of the knuckle piece 4.

Figure 2:
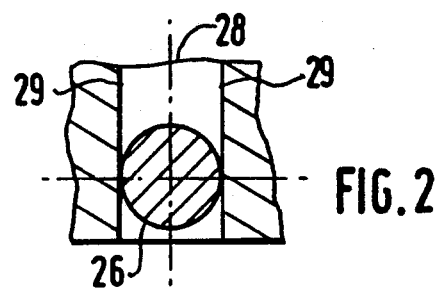
FIG. 2 is a view in partial cross section taken on the line 2—2 in FIG. 1.

The part spherical outer surface 8 is formed on a wall of the outer member 10 and has means for coupling the latter in rotation with the socket 6. In this example this coupling means comprises a radial lug 26 projecting from the part spherical surface 8. This lug 26 is cylindrical in cross section as shown in FIG. 2, and has a curved portion 27 at its outer end. The lug 26 cooperates with an axial groove 28 having parallel flanks 29 and carried on the inside of the socket 6, so as to open out from the open face 24 of the socket.

The axial groove 28 has a base wall 30 which terminates in the open face 24 of the socket 6 at edges which are substantially parallel to the axis YY' of the cylindrical member 9. It extends between these edges through a curved portion 31, the diameter of which is slightly greater than that of the curved portion 27 of the radial lug 26. The curvature of the portion 31 is substantially identical with that of the portion 27. The crank 5, carrying the socket 6, is thus constantly coupled in rotation with the second or outer member 10 of the knuckle piece 4.

Accordingly, in normal operation, the crank 5, the socket 6 and the knuckle piece 4 are coupled in rotation with each other, firstly by cooperation between the lug 26 of the outer member 10 of the knuckle piece 4 and the axial groove 28 in the socket 6, and secondly by cooperation between the radial arm 18 of the ratchet 15 carried by the inner member 9 and the radial recess 23 of the outer member 10 of the knuckle piece 4. This arrangement allows the crank 5 to tilt through any required angle without incurring any risk of damage to the finger 16 of the ratchet 15: the socket 6 tilts on the spherical outer surface 8 of the member 10.

Figure 3:
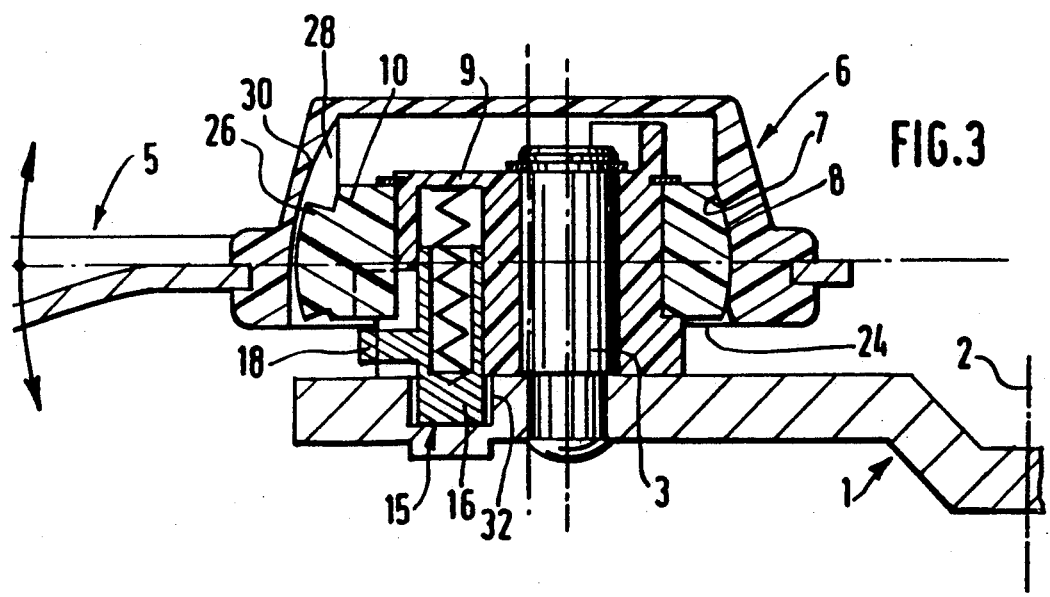
FIG. 3 is a view in cross section showing the apparatus while being placed in a retracted position.

When the windshield wiper is being retracted (FIG. 3), the finger 16 of the ratchet 15 penetrates into an opening 32 which is provided on the cranked arm 1, causing the radial arm 18 to move out of the radial recess 23 of the outer member 10 of the knuckle piece 4. The mode of operation is substantially identical to that which is described in U.S. Pat. No. 4,916,774 mentioned above, with the members 9 and 10 constituting the knuckle piece moving eccentrically during the retracting operation so as to obtain the required degree of eccentricity. During this second movement, the cranked arm 1 and the crank 5 are able to tilt with respect to each other without encountering the obstacle previously presented by the arm 18, which now lies in a radially retracted position with respect to the spherical surface 8 of the knuckle piece 4.

The present invention is of course not limited to the embodiment described, but encompasses any variant. In particular, the cranked driving arm 1 may have associated with it two cranks, substantially parallel with each other, with each end of the these cranks being coupled to the driving arm through a knuckle joint which includes two spherical members, concentric with each other but arranged with one following the other. In that arrangement, each spherical member has a radial lug cooperating with a respective groove formed in the respective socket corresponding to the different cranks.

As will be clear with reference to the foregoing description, in this arrangement with two driven cranks, the cylindrical member of the knuckle piece carries the ratchet, while one of the spherical members, i.e. that which is closest to the cranked arm, includes a recess for receiving the end of the radial arm of the ratchet.

What is claimed is:

1. Windshield wiper apparatus, said apparatus comprising a motor spindle, a first crank arm carried on the motor spindle at one end of the first arm, a pivot pin carried by, and close to the other end, of the first arm, a knuckle piece eccentrically mounted on the said pivot pin, a second crank arm, a socket carried on the second arm, the socket being articulated on the knuckle piece, and a ratchet carried by the knuckle piece and comprising a finger and a radial arm fixed with respect to the finger, the said first crank arm having a first recess for receiving the said finger, wherein the knuckle piece comprises a first member and a second member, with the said first member carrying the ratchet and the said second member having a second recess for receiving the said radial arm of the ratchet.

2. Windshield wiper apparatus according to claim 1, wherein the said first and second members of the knuckle piece are mounted coaxially one within the other so as to be rotatable with respect to each other.

3. Windshield wiper apparatus according to claim 1, wherein the said first member of the knuckle piece has a cylindrical outer surface, the said second member of the knuckle piece having a part spherical outer surface.

4. Windshield wiper apparatus according to claim 1, wherein the said radial arm of the ratchet is arranged to cooperate with the said second recess whereby to couple the said first and second members of the knuckle piece together for simultaneous rotation.

5. Windshield wiper apparatus according to claim 1, further comprising means for coupling the said second member of the knuckle piece in rotation with the second arm.

6. Windshield wiper apparatus according to claim 5, wherein the socket defines a groove on an internal surface thereof, the coupling means for coupling the second member of the knuckle piece with the second arm comprising a lug formed on the knuckle piece for cooperation with the said groove.

7. Windshield wiper apparatus according to claim 6, wherein the said lug extends radially from the part spherical surface of the second member of the knuckle piece.

8. Windshield wiper apparatus according to claim 6, wherein the said lug is cylindrical with a curved free end.

* * * * *